US006243029B1

(12) United States Patent
Tomer

(10) Patent No.: US 6,243,029 B1
(45) Date of Patent: Jun. 5, 2001

(54) PARKULATOR PHOTO PARKING

(76) Inventor: Natan Tomer, 20 Bet Hillel, Tel Aviv (IL), 67017

( * ) Notice: Subject to any disclaimer, the term of this patent is extended or adjusted under 35 U.S.C. 154(b) by 0 days.

(21) Appl. No.: 09/620,425

(22) Filed: Jul. 20, 2000

Related U.S. Application Data

(60) Provisional application No. 60/145,246, filed on Jul. 26, 1999.

(51) Int. Cl.[7] .............................. B60Q 1/48; G08G 1/14

(52) U.S. Cl. ...................... 340/932.2; 340/933; 340/937; 340/5.4; 340/5.42; 340/5.63; 368/90; 235/378; 235/380

(58) Field of Search ............................... 340/932.2, 933, 340/937, 5.1, 5.4, 5.42, 5.63; 368/90; 235/378, 380

(56) References Cited

U.S. PATENT DOCUMENTS

| | | | | |
|---|---|---|---|---|
| 4,717,815 | | 1/1988 | Tomer . | |
| 4,876,540 | * | 10/1989 | Berthon et al. | 340/932.2 |
| 5,153,586 | * | 10/1992 | Fuller | 340/932.2 |
| 5,402,475 | * | 3/1995 | Lesner, Jr. et al. | 379/106 |
| 5,777,951 | * | 7/1998 | Mitschele et al. | 368/90 |
| 5,845,268 | * | 12/1998 | Moore | 705/418 |
| 5,966,345 | * | 10/1999 | Dee et al. | 368/90 |
| 6,037,880 | * | 3/2000 | Manion | 340/932.2 |
| 6,078,272 | * | 6/2000 | Jacobs et al. | 340/932.2 |
| 6,081,206 | * | 6/2000 | Kielland | 340/937 |

* cited by examiner

*Primary Examiner*—Daniel J. Wu
*Assistant Examiner*—Toan Pham
(74) *Attorney, Agent, or Firm*—Tipton L. Randall

(57) ABSTRACT

The invention is a method of monitoring and assessing a fee for parking a vehicle in a toll parking location where the user pays only for the actual parking time used. The invention includes providing indicia for a toll parking location and unique indicia for a vehicle to be positioned in that parking location. The user notifies a remote central control unit the location indicia, the vehicle unique indicia, and the start time of parking the vehicle in the location. Later, the user notifies the remote central control unit of the vehicle unique indicia, and the finish time of parking the vehicle in the location. The remote central control unit then assesses a fee to the user for the duration of time the vehicle occupied the parking location. A method of monitoring parked vehicles to assure compliance with toll parking regulations is also disclosed. A camera device having optical character recognition capabilities photographs vehicle indicia, plus transmits data to and receives data from the remote central control unit to ensure vehicle compliance with regulations. A ticket is issued to those vehicles violating the parking regulations. The camera device also makes a pictorial record of the violation.

19 Claims, No Drawings

PARKULATOR PHOTO PARKING

CROSS-REFERENCE TO RELATED APPLICATIONS, IF ANY

This application claims the benefit under 35 U.S.C. §119 (e) of co-pending provisional application Ser. No. 60/145,246, filed Jul. 26, 1999 application Ser. No. 60/145,246 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

FIELD OF THE INVENTION

The present invention relates to a method of monitoring and assessing a fee for parking a vehicle in a toll parking location and, additionally, to a method of determining if a vehicle is in violation of the requirements for use of the parking location.

BACKGROUND OF THE INVENTION

Conventional parking meters are widely used to control vehicular parking and to encourage maximum turnover of limited parking areas. These parking meters also provide a substantial source of income to the municipality or other organization using such meters. Drawbacks to these meters include high initial investment costs, high maintenance costs, and high collection costs, all complicated by vandalism and pilferage. The user also encounters various drawbacks when using conventional parking meters. Does the user have coins for the meter?. Is the time ordered by inserting coins sufficient to cover the time the user is away from the vehicle?. Upon return to the vehicle, the remaining time on the meter cannot be reclaimed. No receipt or record of the parking expense is available.

Alternatively, a number of municipalities have adopted the use of parking coupons. The coupons have tear out sections which indiciate the date and the expiration time of a particular parking period, the coupons being displayed from the inside of the vehicle by wedging the coupon into the upper end of a closed window. However, these coupons have not been found entirely satisfactory in many locations because of illegally tampering with them for more than one use. Additionally, dividing the city into many parking zones, with each zone requiring a specific coupon, is impractical. Further, there is no incentive to minimize the duration a vehicle occupies the parking location, that is, such a system does not provide "real time parking" capability.

Applicant, in U.S. Pat. No. 4,717,815, has described a time metering device that is useful as a prepaid parking card. The device is a unitary electronic card purchased in advance by the user to provide a pre-purchased time period that may be used as and when desired by the user for parking his vehicle. The card has buttons to select the type of parking zone required, a timer clock showing the amount of purchased time remaining on the card, and switches to start and stop the timer clock. Thus, the user pays for only the actual time that a vehicle occupies a parking space. The card device is displayed within the vehicle during the time the vehicle occupies the parking location. Various other features of the parking card are also disclosed. However, it is desirable to provide a parking monitoring and fee assessment system that requires no special devices by the user. To this end, applicant has devised a unique method of monitoring and assessing a fee for parking a vehicle in a toll parking location. The method further provides means for detecting that a parked vehicle is in violation of the requirements for the toll parking location.

SUMMARY OF THE INVENTION

The invention is a method of monitoring and assessing a fee for parking a vehicle in a toll parking location. The invention includes providing indicia for a toll parking location and unique indicia for a vehicle to be positioned in that parking location. The user notifies a remote central control unit the location indicia, the vehicle unique indicia, and the start time of parking the vehicle in the location. Later, the user notifies the remote central control unit the vehicle unique indicia, and the finish time of parking the vehicle in the location. The remote central control unit then assesses a fee to the user for the duration of time the vehicle occupied the parking location.

To monitor the vehicles occupying a toll parking location, a controller individual images the unique indicia of a vehicle parked in the toll parking location with a camera device having optical character recognition capability. The camera device transmits to the remote central control unit the data for the unique indicia of the vehicle parked in the toll parking location. The data may be digital or in full picture format. The camera device receives from the remote central control unit confirmatory data on the vehicle parked in the toll parking location. For those vehicles illegally parked, the camera device may produce a pictorial record of the vehicle in violation of the toll parking location requirements. In a further embodiment, the camera device then prints a ticket document assessing a fine on the vehicle in violation of the toll parking location requirements.

The invention also includes the imaging device for imaging a vehicle with unique indicia located in a toll parking location. The device has a means for imaging a vehicle unique indicia, and optical character recognition means for digitizing the unique indicia image. A storage means for retaining the digitized image of the vehicle unique indicia is contained in the device. A transmitting means for communicating the digitized image of the vehicle unique indicia to the remote central control unit, and a receiving means for obtaining data from the remote central control unit, is also contained in the device. Also present in the device is a means for producing a visual image of a vehicle unique indicia, and in a further embodiment, means for printing a ticket document used for levying a fine for toll parking violation.

The above summary of the present invention is not intended to describe each illustrated embodiment or every implementation of the present invention. The detailed descriptions that follow more particularly exemplify these embodiments.

DESCRIPTION OF THE PREFERRED EMBODIMENT

The invention is a method of implementing the "real time parking" concept, where the user pays only for the time the vehicle occupies a parking location. In one embodiment, the novel method eliminates the need for any hardware inside the vehicle and makes use of standard communication technology systems to improve and simplify user parking along city streets.

The toll parking locations are provided with various designations or indicia, to identify them as a specific zone. Each vehicle to be parked in the toll parking locations is provided with a unique indicia, such as a registration number or license plate number. In addition, each vehicle that is registered with a remote central control unit displays a permit sticker indiciating the vehicle is so registered. The user parks his vehicle in one of the toll parking locations. The user then employs a telephone and/or modem to contact the remote central control unit notifying the unit of the parking zone occupied (location indicia), the vehicle license number (vehicle unique indicia), and the starting time of parking. The zone identification and telephone number or web location (e.g. call2park.com) of the remote central control unit are posted at or near each parking location. The user may call by telephone, e-mail, cellular Internet communicator, fax, palm PCs or otherwise contact the remote central control unit. Upon return to the parked vehicle, the user again employs a telephone, or similar communication means, to contact the remote central control unit notifying the unit of the vehicle license number (vehicle unique indicia), and the finishing time of parking. The vehicle location need not be repeated since the remote central control unit already has it. The user is not compelled to notify the remote central control unit when he removes his vehicle from the parking zone. In this situation, the user is charged the fall amount of time allowed for the parking zone ordered. For situations where the user desires to notify the remote central control unit of the start or finish of parking from a location distant from the vehicle, a grace period for enforcement, discussed later, is allowed. For users with cellular telephones, cellular Internet communicators, or palm PCs, the notification of the remote central control unit is as simple as entering a series of numbers in the communication device memory for transfer to the remote central unit. The remote central control unit then assesses the user a fee for the duration of time the vehicle occupied the parking location. The remote central control unit is preferably a computer system operated by the municipality, or an operator on behalf of the municipality, or even a private parking authority. The parking fee may be collected in various manners. At the discretion of the vehicle user, the fee may be added to a utility or telephone bill, paid by credit card over the telephone, or paid from a personal banking, parking credit system at the remote central control unit. The remote central control unit is located to service a broad area of toll parking within the municipality's borders. The parking system of the present invention is also applicable to private parking facilities.

For parking locations that are in high demand, short time limits and/or higher rates are imposed on users that occupy these high demand parking locations. When parking in the high demand locations, the user is urged to notify the remote central control unit when the user vacates the location. If the user does not notify on vacating the location, not only is the user charged for the full time limit allowed, but also an additional fee may be added to the toll parking charge. The purpose of mandatory vacate notification is to allow the remote central control unit to monitor the number and location of the high demand toll parking locations. Further, users can access the availability of the high demand parking locations through the remote central control unit, thereby providing easier access by users to available toll parking locations. The central control unit may provide such information via the Internet with domain names such as: Call2park.com, RealTimeParking.com, PhotoParking.com, Wapark.net or Parkulator.com.

Thus, the remote central control unit includes a multi-integrated interactive database capable of calculating parking intervals and monitoring and managing parking transactions. The remote central control unit executes parking orders from individual users, sends verification to parking officers and stores evidence of illegal parking for use in traffic courts. The remote central control unit can adjust parking rates and location time limits according to the municipality's regulations. The remote central control unit continuously gathers extensive data on parked vehicles and the influx and departure of vehicles from the controlled parking areas. The data can be used for informing other drivers of parking location availability as described above, as well as statistics of parking location use to improve city parking zone configurations.

In an alternative embodiment of the present invention, the user employs a cellular parking validation (CPV) device, termed a Parkulator, to notify the remote central control unit of commencement and cessation of vehicle parking. The CPV device automatically transmits the vehicle unique indicia and the start/stop time to the remote central control unit when activated/deactivated. Where multiple rate parking zones are available, the user inputs the zone occupied and this information is transmitted to the remote central control unit. The CPV device employs wireless application protocol (WAP), operated like a standard cellular telephone, to contact the remote central control unit via the Internet. In use, the CPV device is prominently displayed within the parked vehicle and has a visual indiciator to show that the CPV device has notified the remote central control unit of use of the parking location. The visual indiciator may include an LED, a LCD or similar display. The visual indiciator confirms to the user, as well as to a parking officer monitoring toll parking, that the remote central control unit has been contacted. The visual indiciator ceases when the user deactivates the Parkulator device upon leaving the toll parking location.

Should the vehicle remain in the toll parking location beyond the set time limit for that particular zone, the remote central control unit transmits a signal to the CPV device that deactivates the visual indiciator and thereby records a parking ticket for that vehicle. Alternatively, the Parkulator device is preprogrammed to deactivate itself after being activated for the set time limit duration for that particular parking zone occupied by the vehicle.

In a further embodiment of the invention, the CPV device includes a global positioning system (GPS) to transmit the vehicle parking location to the remote central control unit with the above described vehicle information. In this manner only a single button or switch on the CPV device is required to fully implement the real time parking system. Similarly, vehicle parking location may be correlated with the origination location of a cellular telephone used to order parking.

Monitoring of vehicles parked in toll parking locations is achieved by parking officers using special automated cameras to verify the authenticity of the parked vehicles. A device, such as a digital camera, with optical character recognition (OCR) capability is employed to scan the license plate (unique indicia) of a vehicle parked in the toll parking location. The digital camera device converts the license plate characters to digital format and transmits the digital data for the vehicle license plate to the remote central control unit to verify the user has notified the remote central control unit that the vehicle is occupying the parking location. The device may include a keyboard for verifying or correcting the license plate characters. The data transmittal and reception by the digital camera device is by cellular or otherwise wireless communication. The digital camera device then receives confirmatory data from the remote central control unit on that particular vehicle.

In an alternative embodiment, the camera device transmits the license plate full image to the central control unit where the plate indicia is converted to a digital format for verification as described above.

In a further embodiment of the invention, the camera device includes a GPS feature that associates the vehicle indicia with the occupied parking location via the GPS. Both vehicle indicia and parking location can thus be transmitted to the remote central control unit or stored in the camera device for future reference If the vehicle user has notified the remote central control unit to initiate his parking time, the digital camera device receives a confirmation signal, and the parking officer takes no further action. If parking for that particular vehicle has not been ordered, or the vehicle is illegally parked, the digital camera device receives a different confirmation signal and the parking officer issues a pending parking ticket or warning note using the digital camera device to print the pending ticket/warning note. The pending ticket/warning note might read: "Dear vehicle owner, At this date . . . and this time . . . your vehicle has been photographed. If you have properly ordered parking as required, please disregard this message." Alternatively, the ticket/warning note printing may be achieved with a small auxiliary printer device connected to the digital camera device. Additionally, the parking officer uses the digital camera device to record and print a pictorial record of the illegally parked vehicle for use in court proceedings, if needed. It may be necessary to download "pictures" to the remote central control unit such that the digital camera device is not overloaded during a particular working shift for the parking officer.

As mentioned above, a grace period for enforcement of regulations is provided for the user who desires to notify the remote central control unit from a location some distance from the parked vehicle. For instance, a user parks his vehicle and continues on to his destination from where he notifies the remote central control unit of the details of the parked vehicle. The grace period to notify the remote central control unit is uniform within the municipality, and set by the particular municipality or the remote central control unit, e.g. 10 minutes. Since the officer and the remote central control unit are not aware when the vehicle started parking, the officer images the vehicle and leaves a pending ticket/warning note as described above. When the user notifies the remote central control unit within the grace period, the record of the pending ticket is immediately canceled from the control unit system and a cancellation confirmation sent to the officer's imaging device. Thus, when the user notifies the remote central control unit within the grace period, proper confirmation is obtained the next time the officer turns on the digital camera even when the officer has moved on to another location. This confirmation automatically cancels the pending ticket and erases the stored picture of the vehicle in the digital camera. Should the officer return to a vehicle already having a pending ticket, and the grace period has elapsed, a full ticket is issued, although the officer need not return for issuance of a ticket, as outlined below. If the user does not notify the remote central control unit, or notifies after the grace period, the officer issues a ticket for the violating vehicle. Likewise, if the vehicle continues to occupy the parking location after the maximum time limit, the officer issues a ticket. Preferably, the remote central control unit generates all official parking tickets and mails the official ticket to the home of the vehicle user. The official ticket is sent to the vehicle user by registered mail to prevent the user from claiming that there was no sign of a ticket on the vehicle that was parked in the toll parking location.

Although the imaging device of the present invention is described as a digital camera device, other imaging devices are contemplated. The devices include video type cameras, and other "still" type imaging devices. The digital camera device of the present invention can be used as a stand-alone system that can be used to produce parking tickets supported by hard imaging evidence of the illegally parked vehicle. The stand-alone system can be employed with other widely used parking fee collection methods, such as metered parking locations, purchased parking permits for specific locations, or even limited duration "free parking".

The invention concept is based upon existing communication networks, with four categories of communication utilized. The users communicate with the remote central control unit through wireless cellular telephone, "wired" telephone, cellular Internet third generation mobile phones or by using the Internet. The parking officer uses wireless communication for on-line data transmission and retrieval needs. Data is transferred through computer links on the Internet, such as websites, servers or special "portals", or other network systems. The central control unit may communicate via the Internet using domain names such as: Call2park.com, RealTimeParking.com, PhotoParking.com, Wapark.net or Parkulator.com, these domain names already registered for this purpose.

The remote central control unit is the heart of the system. All potentially parked cars are registered at the remote central unit upon the user's request. All billing is handled through the remote central unit. All parking tickets are processed, and the remote central unit performs notification to users, with follow-ups performed. Court evidence is generated for use in cases where the user disputes the parking ticket. The attached Tables 1, 2 and 3 list the various features that make the Parkulator Photo Parking system unique.

While the present invention has been described with reference to several particular example embodiments, those skilled in the art will recognize that many changes may be made thereto without departing from the spirit and scope of the present invention, which is set forth in the following claims.

TABLE 1

| PARKULATOR PHOTO PARKING SYSTEM | | |
|---|---|---|
| USER | CONTROL CENTER | ENFORCEMENT OFFICER |
| Vehicle Parking | Parking Computer Control Room | Parkulator Camera |
| Registration | City Streets-Zone Data Base | Video Optional |

TABLE 1-continued

| PARKULATOR PHOTO PARKING SYSTEM | | |
|---|---|---|
| USER | CONTROL CENTER | ENFORCEMENT OFFICER |
| Location: Zone/Time | Software | Take Photo |
| Telephone or Internet | Hardware | Read Photo - License Plate |
| Cellular Phone or WAP-Cell + Internet | Communications | Transmit to Verify |
| Conventional Telephone | Communication to Users | Receive to Confirm |
| Call within "grace period" | Communication to Officer | Issue Pending Ticket |
| Call after "grace period" | Communication to Courts | Issue Final Ticket |
| Send e-mail after parking | Automatic Cancellation of Pending Ticket | |
| "Call" e-mail after parking | Support Evidence to Courts | |

TABLE 2

| Parkulator Camera |
|---|
| Electronic Camera |
| Hardware |
| Scanner to Read Characters on License Plate |
| Software |
| Modem |
| Communications - Transmit/Receive |
| Save Images |
| Print Report |
| GPS Capabilities |

TABLE 3

| Sequence of Steps to use the Parkulator System |
|---|
| Option 1 - Cellular Phone |
| 1. Park your vehicle |
| 2. Verify location and zone |
| 3. Call parking center and enter location and zone |
| 4. Leave vehicle and proceed with your business |
| Option 2 - Standard Phone |
| 1. Park your vehicle |
| 2. Verify location and zone for future reference |
| 3. Leave vehicle and proceed with your business |
| 4. Call parking center from nearby phone to enter location and start time |
| Option 3 - Internet Communication |
| 1. Park your vehicle |
| 2. Verify location and zone for future reference |
| 3. Leave vehicle and proceed with your business |
| 4. E-mail parking center from nearby computer to enter location and start time. |
| Option 4 - CPV Device Communication |
| 1. Park your vehicle |
| 2. Verify location and zone for future reference |
| 3. Activate CPV device and display device prominently in vehicle. |
| 4. Deactivate CPV device to end parking charges. |
| To End Parking |
| 1. Notify parking center of departure time by communication means used to register start time, or just remove vehicle from parking zone before time limit expires. |
| 2. Remove vehicle from parking zone |

I claim:

1. A method of monitoring and assessing a fee for real time parking a vehicle in a toll parking location comprising the steps;

(a) providing indicia for the toll parking location and unique indicia for a vehicle to be positioned in the parking location;

(b) notifying a remote central control unit by the user, the location indicia, the vehicle unique indicia, and the start time of parking the vehicle in the parking location;

(c) notifying a remote central control unit by the user, the vehicle unique indicia, and the finish time of parking the vehicle in the parking location; and (d) assessing, by the remote central control unit, a fee to the user for the duration of time the vehicle occupied the parking location.

2. A method of monitoring and assessing a fee for real time parking a vehicle in a toll parking location according to claim 1 further comprising the step;

(e) assessing, by the remote central control unit, an additional fee to the user for exceeding a selected parking time duration for the vehicle in the parking location.

3. A method of monitoring and assessing a fee for real time parking a vehicle in a toll parking location according to claim 1 further comprising the steps;

(f) imaging the unique indicia of the vehicle parked in the toll parking location with a camera device having optical character recognition capabilities;

(g) transmitting to the remote central control unit, by the imaging device, the data for the unique indicia of the vehicle parked in the toll parking location; and (h) receiving from the remote central control unit by the imaging device, confirmatory data on the vehicle parked in the toll parking location.

4. A method of monitoring and assessing a fee for real time parking a vehicle in a toll parking location according to claim 3 further comprising the step;

(i) producing a pictorial record of the vehicle in violation of the toll parking location requirements.

5. A method of monitoring and assessing a fee for real time parking a vehicle in a toll parking location according to claim 3 further comprising the step;

(j) printing a warning ticket document assessing a fine on the vehicle in violation of the toll parking location requirements.

6. A method of monitoring and assessing a fee for real time parking a vehicle in a toll parking location according to claim 1 wherein providing unique indicia for the vehicle includes providing a registration sticker for display on the vehicle.

7. A method of monitoring and assessing a fee for real time parking a vehicle in a toll parking location according to claim 1 wherein notifying a remote central control unit by the user includes at least one of: contacting the remote central control unit via telephone, cellular phone, WAP and the Internet.

8. A method of monitoring and assessing a fee for real time parking a vehicle in a toll parking location according to claim 1 wherein notifying a remote central control unit by the user includes activating/deactivating a cellular parking validation device contained within the vehicle.

9. A method of monitoring and assessing a fee for real time parking a vehicle in a toll parking location according to claim 8 wherein notifying a remote central control unit by the user includes activating/deactivating a cellular parking validation device having a global positioning system (GPS) therein, the device contained within the vehicle.

10. A method of monitoring and assessing a fee for real time parking a vehicle in a toll parking location according to claim 1 wherein assessing a fee to the user for the duration of time the vehicle occupied the parking location includes determining a parking duration from a parking start time and stop time, applying a cost per unit time for parking duration, and determining a parking fee for the user by the remote central control unit.

11. A method of monitoring and assessing a fee for real time parking a vehicle in a toll parking location comprising the steps;

(a) providing indicia for the toll parking location and unique indicia for a vehicle to be positioned in the parking location;

(b) notifying a remote central control unit by the user, the location indicia, the vehicle unique indicia, and the start time of parking the vehicle in the parking location;

(c) notifying a remote central control unit by the user, the vehicle unique indicia, and the finish time of parking the vehicle in the parking location;

(d) assessing, by the remote central control unit, a fee to the user for the duration of time the vehicle occupied the parking location;

(e) assessing, by the remote central control unit, an additional fee to the user for exceeding a selected parking time duration for the vehicle in the parking location;

(f) imaging the unique indicia of the vehicle parked in the toll parking location with a camera device having optical character recognition capabilities;

(g) transmitting to the remote central control unit, by the imaging device, the data for the unique indicia of the vehicle parked in the toll parking location; and (h) receiving from the remote central control unit by the imaging device, confirmatory data on the vehicle parked in the toll parking location.

12. A method of monitoring and assessing a fee for real time parking a vehicle in a toll parking location according to claim 11 further comprising the step;

(i) producing a pictorial record of the vehicle in violation of the toll parking location requirements.

13. A method of monitoring and assessing a fee for real time parking a vehicle in a toll parking location according to claim 11 further comprising the step;

(j) printing a warning ticket document assessing a fine on the vehicle in violation of the toll parking location requirements.

14. A method of monitoring and assessing a fee for real time parking a vehicle in a toll parking location according to claim 11 wherein providing unique indicia for the vehicle includes providing a registration sticker for display on the vehicle.

15. A method of monitoring and assessing a fee for real time parking a vehicle in a toll parking location according to claim 11 wherein notifying a remote central control unit by the user includes at least one of: contacting the remote central control unit via telephone, cellular phone, WAP and the Internet.

16. A method of monitoring and assessing a fee for real time parking a vehicle in a toll parking location according to claim 11 wherein notifying a remote central control unit by the user includes activating/deactivating a cellular parking validation device contained within the vehicle.

17. A method of monitoring and assessing a fee for real time parking a vehicle in a toll parking location according to claim 16 wherein notifying a remote central control unit by the user includes activating/deactivating a cellular parking validation device having a global positioning system (GPS) therein, the device contained within the vehicle.

18. A method of monitoring and assessing a fee for real time parking a vehicle in a toll parking location according to claim 11 wherein transmitting the data for the unique indicia of the vehicle includes transmitting a full image of the unique indicia to the remote central control unit.

19. A method of monitoring and assessing a fee for real time parking a vehicle in a toll parking location according to claim 11 wherein assessing a fee to the user for the duration of time the vehicle occupied the parking location includes determining a parking duration from a parking start time and stop time, applying a cost per unit time for parking duration, and determining a parking fee for the user by the remote central control unit.

* * * * *